(12) United States Patent
Wen et al.

(10) Patent No.: US 10,300,364 B2
(45) Date of Patent: May 28, 2019

(54) METHOD OF DRIVING MANNED VEHICLE

(71) Applicant: KINPO ELECTRONICS, INC., New Taipei (TW)

(72) Inventors: Jen-Han Wen, New Taipei (TW); Chih-Lin Lin, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 179 days.

(21) Appl. No.: 15/656,511

(22) Filed: Jul. 21, 2017

(65) Prior Publication Data

US 2018/0369683 A1 Dec. 27, 2018

(30) Foreign Application Priority Data

Jun. 27, 2017 (CN) .......................... 2017 1 0499064

(51) Int. Cl.
| | |
|---|---|
| *A63C 17/01* | (2006.01) |
| *A63C 17/12* | (2006.01) |
| *B60L 15/20* | (2006.01) |
| *G01G 19/12* | (2006.01) |
| *G01G 19/44* | (2006.01) |

(52) U.S. Cl.
CPC .......... *A63C 17/011* (2013.01); *A63C 17/12* (2013.01); *G01G 19/12* (2013.01); *G01G 19/44* (2013.01); *B60L 15/20* (2013.01); *B60L 2200/20* (2013.01)

(58) Field of Classification Search
CPC ...... A63C 17/011; A63C 17/12; G01G 19/12; G01G 19/44; B60L 15/20; B60L 2200/20
See application file for complete search history.

(56) References Cited

U.S. PATENT DOCUMENTS

| | | | | |
|---|---|---|---|---|
| 7,481,291 | B2* | 1/2009 | Nishikawa | B62K 17/00 180/181 |
| 8,738,278 | B2* | 5/2014 | Chen | B62K 11/007 701/124 |
| 9,376,155 | B2* | 6/2016 | Ying | B62D 51/001 |
| 2004/0063556 | A1* | 4/2004 | Wischusen | A63B 21/0004 482/148 |
| 2009/0288900 | A1* | 11/2009 | Takenaka | B62K 11/007 180/218 |
| 2011/0307155 | A1* | 12/2011 | Simard | F02D 11/105 701/93 |
| 2017/0101129 | A1* | 4/2017 | Ying | B62D 11/003 |
| 2017/0217489 | A1* | 8/2017 | Ying | B62D 11/003 |

* cited by examiner

*Primary Examiner* — Hussein Elchanti

(74) *Attorney, Agent, or Firm* — Muncy, Geissler, Olds & Lowe, P.C.

(57) ABSTRACT

A method of driving a manned vehicle includes following steps of: acquiring correspondingly initial weight values of a plurality of weight sensors, each weight sensor is corresponding to a direction; acquiring correspondingly weight measurement values by the weight sensors; calculating correspondingly a weight ratio of each weight sensor according to the initial weight value and the weight measurement value of each weight sensor; producing a control command according to the direction corresponding to the weight sensor when the weight ratio of any one of the weight sensors is greater than a first threshold value; and driving the manned vehicle to move according to the control command. Accordingly, it is to effectively reduce the size and weight of the manned vehicle and reduce the difficulty of controlling the manned vehicle by intuitively controlling moving directions of the manned vehicle according to variations of the center of gravity of a user.

14 Claims, 9 Drawing Sheets

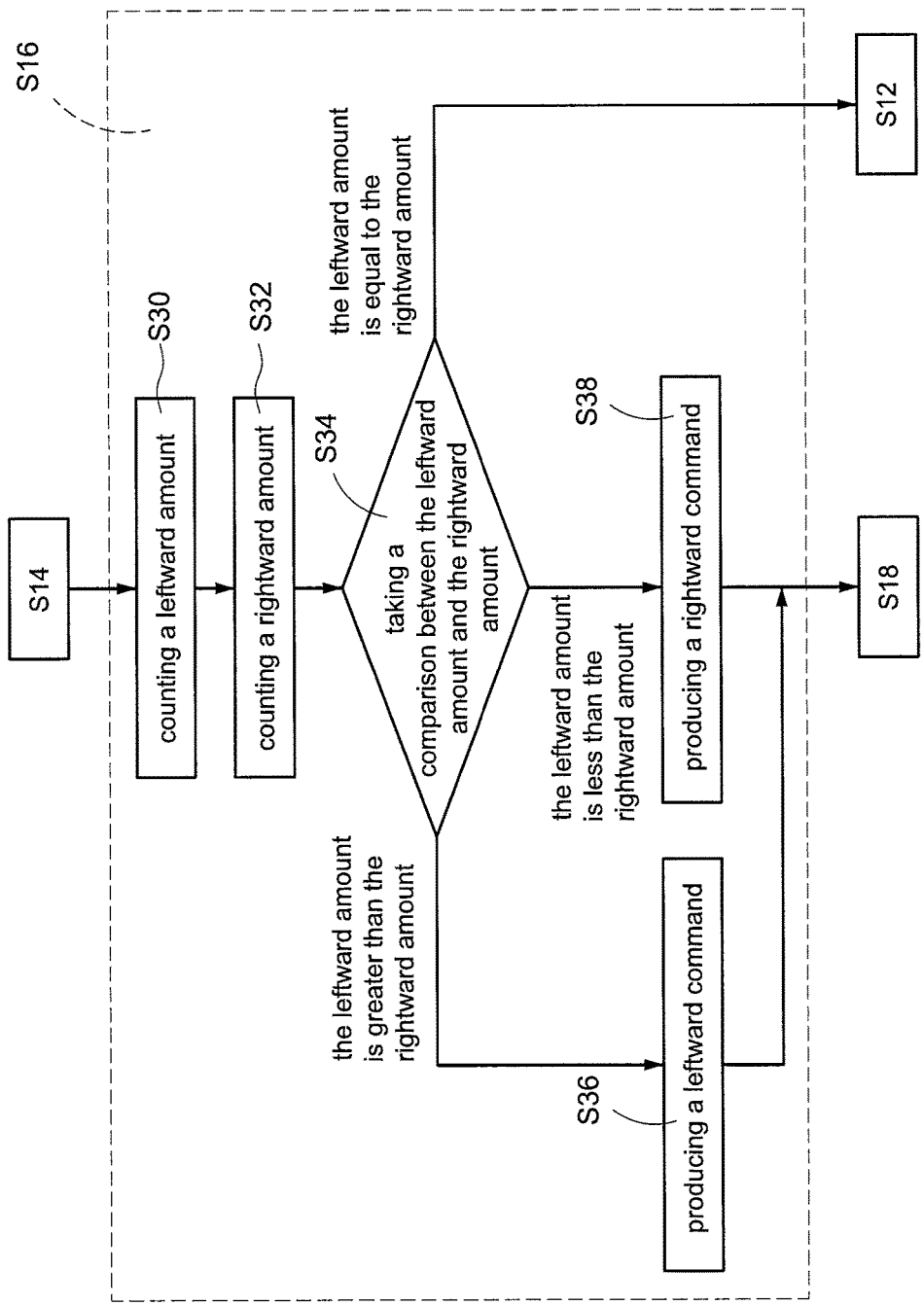

METHOD OF DRIVING MANNED VEHICLE

BACKGROUND OF THE INVENTION

1. Technical Field

The present disclosure relates to a driving method, and more particularly to a method of driving a manned vehicle.

2. Description of Related Art

In order to immediately control moving directions of a manned vehicle, the existing manned vehicle, such as an electric skateboard must additionally install a manipulative device, such as a steering handle for a user to control moving directions of the manned vehicle. However, the installation of the manipulative device increases the size and weight of the manned vehicle. In addition, the user may fall down or bump into obstacles to cause the user to be injured once the user who is less experienced in using the manned vehicle excessively or insufficiently steers the manned vehicle.

SUMMARY OF THE INVENTION

The disclosure is directed to a method of driving a manned vehicle to intuitively control moving directions of the manned vehicle by a user according to a center of gravity of the user without additionally installing any manipulative device.

One of the exemplary embodiments, a method of driving a manned vehicle, applied to a manned vehicle having a plurality of weight sensors, the method including steps of: (a) acquiring correspondingly an initial weight value of each weight sensor, wherein each weight sensor is corresponding to a direction; (b) acquiring correspondingly a weight measurement value by each weight sensor; (c) calculating correspondingly a weight ratio of each weight sensor according to the initial weight value and the weight measurement value of each weight sensor; (d) producing a control command according to the direction corresponding to the weight sensor when the weight ratio of any one of the weight sensors is greater than a first threshold value; and (e) driving the manned vehicle to move according to the control command.

One of the exemplary embodiments, each weight sensor is corresponding to one of a forward direction, a backward direction, a leftward direction, and a rightward direction.

One of the exemplary embodiments, in the step (b), acquiring a plurality of weight measurement values continuously measured by the weight sensors within a default measurement time interval, or acquiring a certain number of weight measurement values continuously measured by the weight sensors; in the step (c), calculating weight ratios of each weight sensor according to each initial weight value and weight measurement values of each weight sensor corresponding to the direction.

One of the exemplary embodiments, each weight sensor is corresponding to the forward direction or the backward direction and also corresponding to the leftward direction or the rightward direction.

One of the exemplary embodiments, the step (d) includes of: (d11) producing a forward command or a backward command according to the direction corresponding to the weight sensor when one of the weight ratios of any one of the weight sensors is greater than the first threshold value; and (d12) producing a leftward command or a rightward command according to the direction corresponding to the weight sensor when one of the weight ratios of any one of the weight sensors is greater than a second threshold value.

One of the exemplary embodiments, the step (d) includes steps of: (d21) deciding a forward amount by counting the amount of the weight ratios which are greater than the first threshold value when the weight sensor is corresponding to the forward direction; (d22) deciding a backward amount by counting the amount of the weight ratios which are greater than the first threshold value when the weight sensor is corresponding to the backward direction; (d23) producing a forward command when the forward amount is greater than the backward amount; and (d24) producing a backward command when the forward amount is less than the backward amount.

One of the exemplary embodiments, in the step (e), driving the manned vehicle to forward move according to the forward command or driving the manned vehicle to stop moving according to the backward command.

One of the exemplary embodiments, the manned vehicle includes a left drive module and a right drive module, wherein the left drive module is linkagely connected to a left drive wheel and the right drive module is linkagely connected to a right drive wheel, and the step (e) includes steps of: (e11) controlling simultaneously the left drive module and the right drive module to rotate along a forward rotation direction according to the forward command when the forward command is detected; and (e12) controlling simultaneously the left drive module and the right drive module to stop rotating according to the backward command when the backward command is detected.

One of the exemplary embodiments, the step (d) includes steps of: (d31) deciding a leftward amount by counting the amount of the weight ratios which are greater than a second threshold value when the weight sensor is corresponding to the leftward direction; (d32) deciding a rightward amount by counting the amount of the weight ratios which are greater than the second threshold value when the weight sensor is corresponding to the rightward direction; (d33) producing a leftward command when the leftward amount is greater than the rightward amount; and (d34) producing a rightward command when the leftward amount is less than the rightward amount.

One of the exemplary embodiments, in the step (e), driving the manned vehicle to leftward move according to the leftward command or driving the manned vehicle to rightward move according to the rightward command.

One of the exemplary embodiments, the manned vehicle includes a left drive module and a right drive module, wherein the left drive module is linkagely connected to a left drive wheel and the right drive module is linkagely connected to a right drive wheel, and the step (e) includes steps of: (e21) controlling a speed of the left drive module to be less than a speed of the right drive module according to the leftward command when the leftward command is detected; and (e22) controlling a speed of the right drive module to be less than a speed of the left drive module according to the rightward command when the rightward command is detected.

One of the exemplary embodiments, further including steps of: (f1) providing a leftward moving indication through a human-machine interface of the manned vehicle when the leftward command is detected; and (f2) providing a rightward moving indication through the human-machine interface when the rightward command is detected.

One of the exemplary embodiments, before the step (a) further including steps of:

(a1) entering a load-carrying condition when a weight variation is detected, and acquiring a plurality of load-carrying weight values continuously measured by the weight sensors within a default initial time interval, or acquiring a certain number of load-carrying weight values continuously measured by the weight sensors; and (a2) calculating correspondingly initial weight values of the weight sensors according to the load-carrying weight values measured by the weight sensors.

One of the exemplary embodiments, the step (a) further includes steps of: (a4) receiving a body weight value of a user; and (a5) determining the first threshold value according to the body weight value.

One of the exemplary embodiments, further including steps of: (g1) receiving an acceleration value and a sensitivity value from an external apparatus; and (g2) adjusting the first threshold value according to the sensitivity value; wherein a maximum acceleration of the manned vehicle meets the acceleration value received from the external apparatus.

Accordingly, it is to effectively reduce the size and weight of the manned vehicle and reduce the difficulty of controlling the manned vehicle by intuitively controlling moving directions of the manned vehicle according to variations of the center of gravity of the user.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows:

FIG. 4B shows a partial flowchart of a method of driving the manned vehicle according to a third embodiment of the present disclosure.

DETAILED DESCRIPTION

Figure 1:
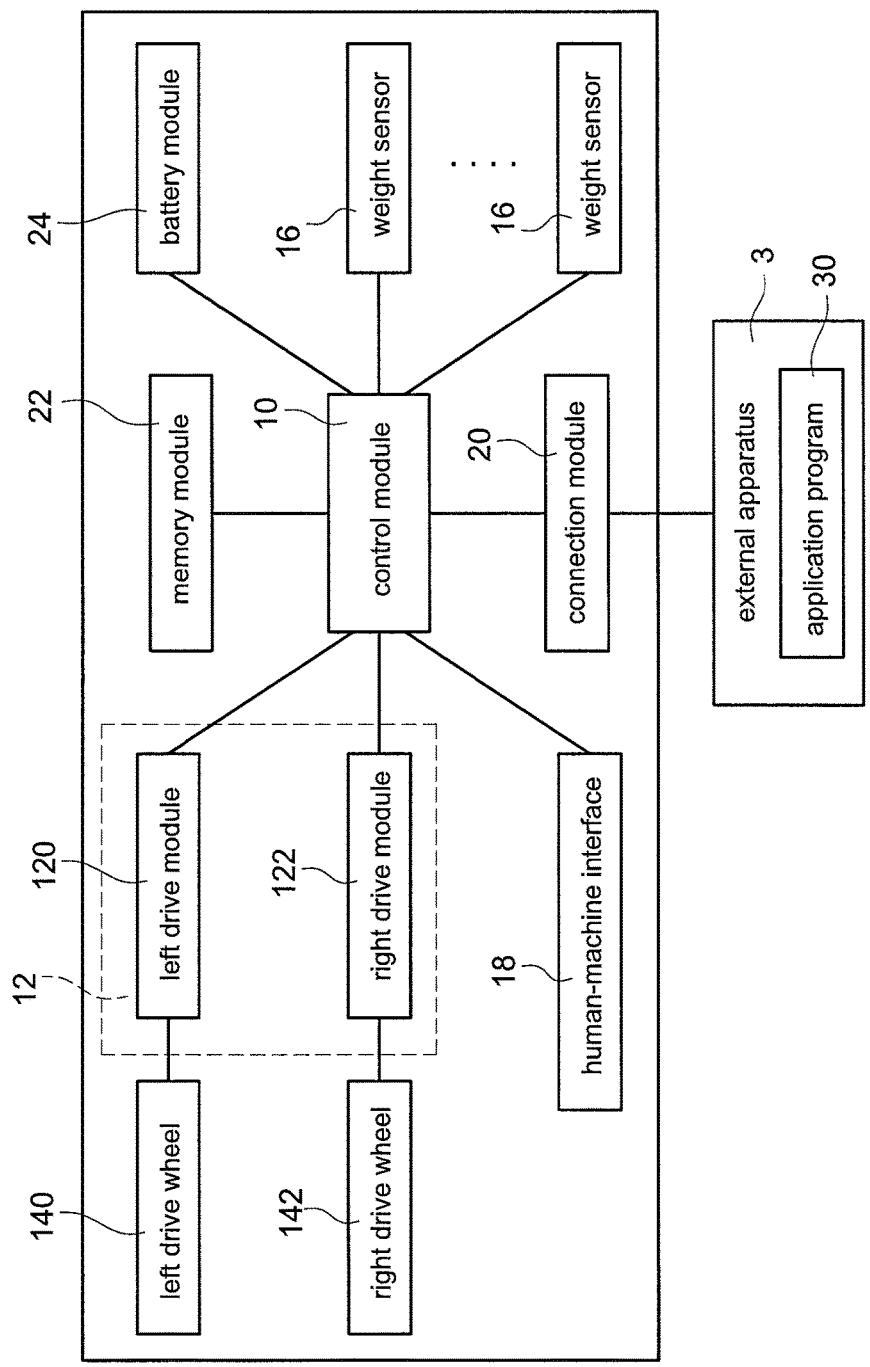
FIG. 1 shows a block structural view of a manned vehicle according to a first embodiment of the present disclosure.

Reference will now be made to the drawing figures to describe the present disclosure in detail. It will be understood that the drawing figures and exemplified embodiments of present disclosure are not limited to the details thereof.

Refer to FIG. 1, which shows a block structural view of a manned vehicle according to a first embodiment of the present disclosure. The manned vehicle 1 disclosed in FIG. 1 may be intuitively driven by a user to control moving directions of the manned vehicle 1 according to a center of gravity of the user without additionally installing any manipulative device.

In particular, when the user attempts to control moving directions of the manned vehicle 1 by changing a center of gravity of the user, weight variations of the manned vehicle 1 can be recognized in response to the user's moving intentions, such as forward moving intention, backward/stop (hereinafter referred to as "backward" and described in detail below) moving intention, leftward moving intention, and rightward moving intention. Accordingly, the moving directions of the manned vehicle 1 can be controlled by the user according to the recognition of the weight variations of the manned vehicle 1.

The manned vehicle 1 mainly includes a control module 10, a drive module 12, a plurality of drive wheels, and a plurality of weight sensors 16. For example, but not limited to, a left drive wheel 140 and a right drive wheel 142 shown in FIG. 1 are used in an embodiment. Also, the number of the drive wheels and configuration manners of drive wheels are not limited.

The control module 10 is electrically connected to the drive module 12 and the weight sensors 16 to control the manned vehicle 1.

The drive module 12 is connected to a plurality of drive wheels to linkagely drive the drive wheels to rotate so that the manned vehicle 1 is driven to move by the drive module 12.

In an embodiment, the drive module 12 includes a left drive module 120 and a right drive module 122. The left drive module 120 is connected to the left drive wheel 140 to linkagely drive the left drive wheel 140 to rotate. The right drive module 122 is connected to the right drive wheel 142 to linkagely drive the right drive wheel 142 to rotate.

Figure 2A:
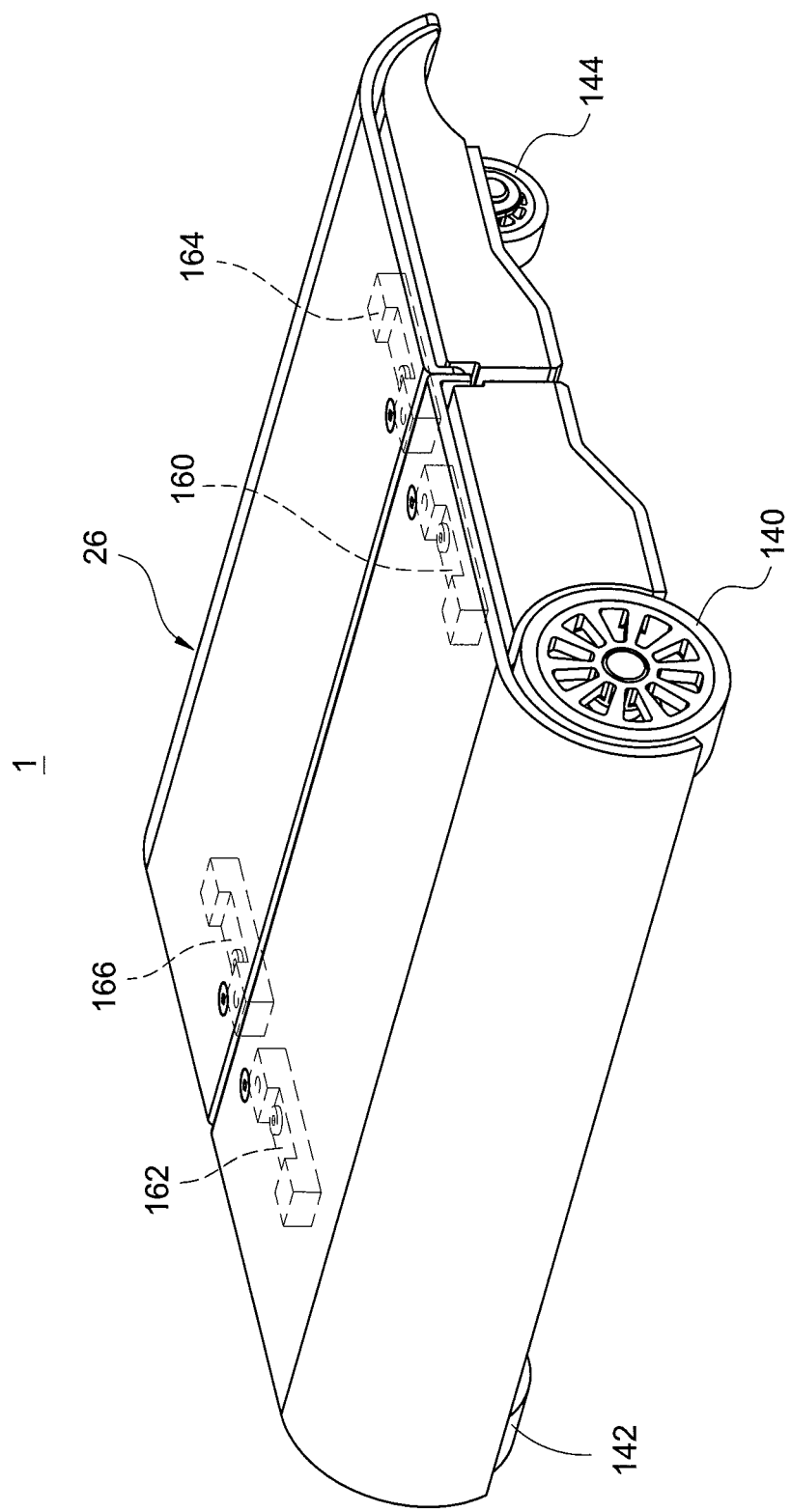
FIG. 2A shows a schematic top view of the manned vehicle according to a second embodiment of the present disclosure.

The weight sensors 16 are used to measure a weight variation of a carrying board of the manned vehicle 1, wherein the carrying board may be a carrying board 26 shown in FIG. 2A.

In an embodiment, each of the weight sensors 16 is previously defined corresponding to at least one direction, such as a forward direction, a backward/stop direction (hereinafter referred to as "backward direction" and described in detail below), a leftward direction, or a rightward direction mentioned above. In addition, the weight sensors 16 are appropriately installed on a bottom surface of the carrying board 26 according to the corresponding directions.

If each weight sensor 16 is previously defined corresponding to a single direction, each weight sensor 16 is corresponding to one of the forward direction, the backward direction, the leftward direction, and the rightward direction.

If each weight sensor 16 is previously defined corresponding to multiple directions, each weight sensor 16 is corresponding to the forward direction or the backward direction and also corresponding to the leftward direction or the rightward direction.

For example, if the weight sensor 16 is previously defined corresponding to the forward direction and the leftward direction, the weight sensor 16 may be installed on a positon of the bottom surface of the carrying board 26 which is corresponding to a left-front position of a top surface of the carrying board 26, such as a position on which a weight sensor 160 is installed as shown in FIG. 2A. Similarly, if the weight sensor 16 is previously defined corresponding to the backward direction and the right direction, the weight sensor 16 may be installed on a positon of the bottom surface of the carrying board 26 which is corresponding to a right-rear position of the top surface of the carrying board 26, such as a position on which a weight sensor 166 is installed as shown in FIG. 2A.

In an embodiment, each weight sensor 16 is a strain gauge vertically installed on the bottom surface of the carrying board 26 so as to measure the amount of strain in the vertical direction thereof, thereby measuring a weight value of the positon on which the weight sensor is installed.

In an embodiment, the manned vehicle 1 further includes a human-machine interface 18 electrically connected to the control module 10. The human-machine interface 18 may be an indicator light, a buzzer, a speaker, a button, or a display, and the human-machine interface 18 is operated by the user or is provided to render indications.

In an embodiment, the manned vehicle 1 further includes a connection module 20 electrically connected to the control module 10. The connection module 20 may be a Wi-Fi wireless module, a Bluetooth wireless module, a USB wired module, or so on. The connection module 20 is connected to an external apparatus 3 and communicated with the external apparatus 3 in a wireless manner or a wired manner. The external apparatus 3 may be a smart phone, a tablet computer, a wearable device, or so on. Furthermore, the external apparatus 3 has a non-transitory memory, and an application program 30 is stored in the non-transitory memory. When the application program 30 is executed by the external apparatus 3, a connection between the external apparatus 3 and the connection module 20 of the manned vehicle 1 can be automatically built.

In an embodiment, the manned vehicle 1 further includes a memory module 22 electrically connected to the control module 10. The memory module 22 is used to store data, such as threshold values or an initial weight value mentioned below.

In an embodiment, the manned vehicle 1 further includes a battery module 24 electrically connected to the control module 10. The battery module 24 is, for example but not limited to, installed on the bottom surface of the carrying board 26 to provide the required power for the manned vehicle 1. In particular, the bottom surface is opposite to the top surface of the carrying board 26, and the top surface on which the user stands.

Figure 2B:
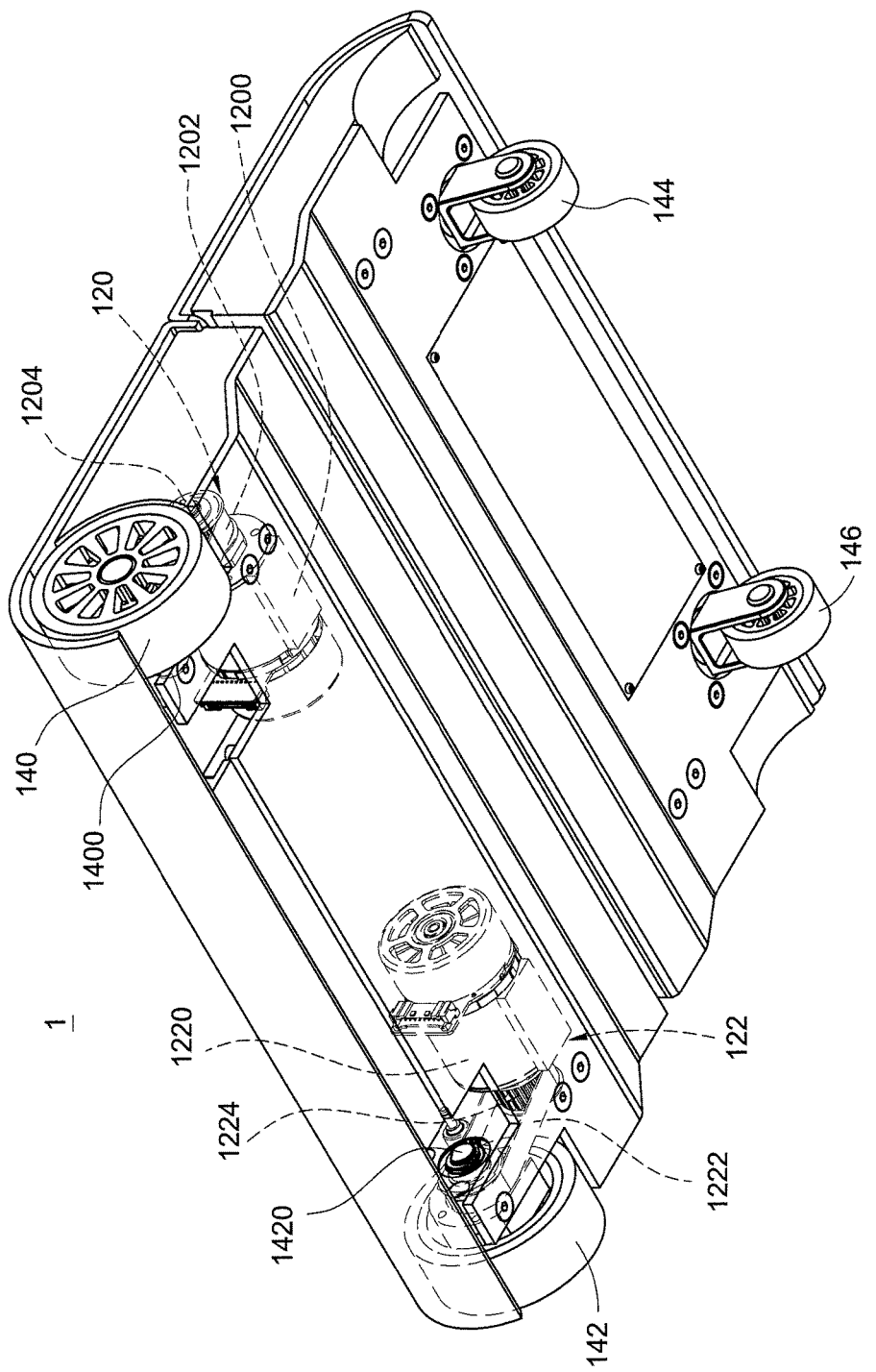
FIG. 2B shows a schematic bottom view of the manned vehicle according to the second embodiment of the present disclosure.

Refer to FIG. 2A and FIG. 2B, which show a schematic top view and a schematic bottom view of the manned vehicle according to a second embodiment of the present disclosure, respectively.

As shown in FIG. 2A and FIG. 2B, the manned vehicle 1 may be an electric skateboard. The electric skateboard provides four weight sensors 160-166. In this embodiment, the manned vehicle 1 is a front-drive vehicle, namely the left drive wheel 140 and the right drive wheel 142 are installed at the front of the manned vehicle 1, and two linkage wheels 144-146 are installed at the rear of the manned vehicle 1 opposite to the front of the manned vehicle 1 for balancing the manned vehicle 1.

In this embodiment, the left drive module 120 includes a left motor 1200, a left belt 1202, and a left drive lever 1204. The left drive wheel 140 includes a left linkage lever 1400. The left belt 1202 is sleeved on the left drive lever 1204 and the left linkage lever 1400 so that the left drive wheel 140 is driven to rotate by rotating the left linkage lever 1400 driven by the left drive lever 1204. The right drive module 122 includes a right motor 1220, a right belt 1222, and a right drive lever 1224. The right drive wheel 142 includes a right linkage lever 1420. The right belt 1222 is sleeved on the right drive lever 1224 and the right linkage lever 1420 so that the right drive wheel 142 is driven to rotate by rotating the right linkage lever 1420 driven by the right drive lever 1224.

Figure 3:
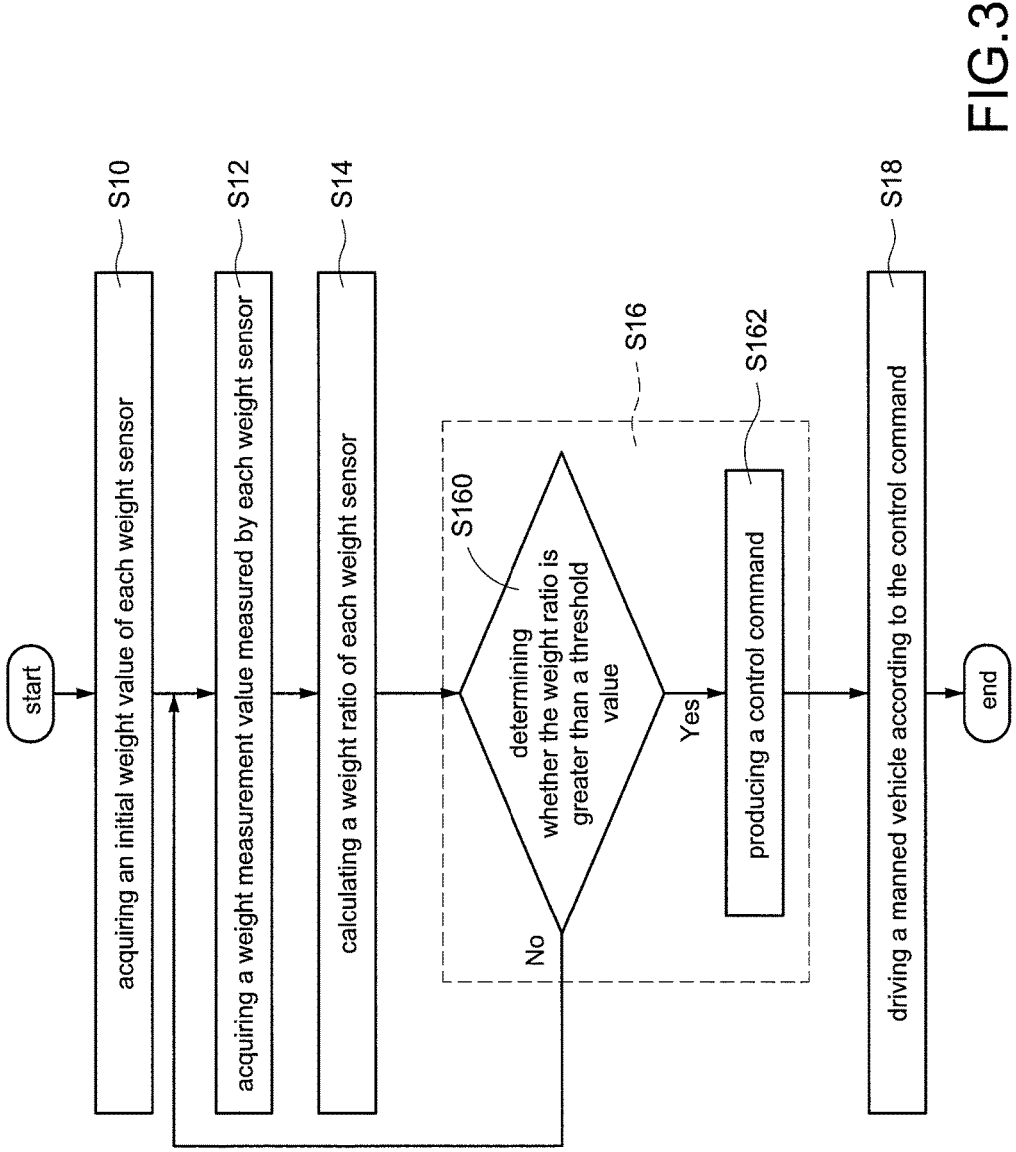
FIG. 3 shows a flowchart of a method of driving a manned vehicle according to a first embodiment of the present disclosure.

Refer to FIG. 3, which shows a flowchart of a method of driving a manned vehicle according to a first embodiment of the present disclosure. In particular, the method is implemented to control the manned vehicle 1 shown in FIG. 1, FIG. 2A, and FIG. 2B.

In the first embodiment shown in FIG. 3, the memory module 22 of the manned vehicle 1 includes a non-transitory non-transitory computer readable medium. Computer firmware or computer software such as an application program is stored in the memory module 22, and computer executable codes are recorded in the computer software. For example, when the control module 10 performs the computer software, the manned vehicle can be controlled by executing steps of the method.

The method of driving the manned vehicle includes following steps.

Step S10: the control module 10 acquires an initial weight value of each weight sensor 16. Also, each weight sensor 16 corresponds to at least one direction.

In an embodiment, each initial weight value of each weight sensor 16 is predetermined by a user, and the initial weight values are, for example but not limited to, stored in the memory module 22.

In another embodiment, each initial weight value of each weight sensor 16 is acquired by executing an initialization procedure by the user described in detail later.

Step S12: each weight sensor 16 is provided to measure a weight variation of the carrying board 26 to produce one or more than one weight measurement values. The control module 10 acquires the weight measurement values measured by the weight sensors 16.

In an embodiment, the control module 10 acquires a plurality of weight measurement values continuously measured by the weight sensors 16 within a default measurement time interval, such as 0.5 seconds.

In an embodiment, the control module 10 continuously acquires a certain number of weight measurement values, such as one thousand of (1,000) weight measurement values from the weight sensors 16.

Step S14: the control module 10 calculates one or more than one weight ratios of each weight sensor 16 according to each initial weight value and one or more than one weight measurement values of each weight sensor 16. In addition, the control module 10 further corresponds each weight ratio to a specific direction, wherein the specific directions are identical to the directions corresponding to the weight sensors 16.

For example, if the control module 10 acquires 1,000 weight measurement values from the weight sensors 16 in the step S12, the control module 10 may correspondingly calculates 1,000 weight ratios of the weight sensors 16 in the step S14.

As shown in FIG. 2A and FIG. 2B, the weight sensor 160 corresponds to the forward direction and the leftward direction. Therefore, the weight ratios calculated by the control module 10 according to the weight measurement values measured by the weight sensor 160 correspond to the forward direction and the leftward direction. Similarly, the weight sensor 162 corresponds to the forward direction and the rightward direction, and therefore the weight ratios correspond to the forward direction and the rightward direction. Similarly, the weight sensor 164 corresponds to the backward direction and the leftward direction, and therefore the weight ratios correspond to the backward direction and the leftward direction. Similarly, the weight sensor 166 corresponds to the backward direction and the rightward direction, and therefore the weight ratios correspond to the backward direction and the rightward direction.

Step S16: the control module 10 determines that whether the manned vehicle 1 needs to move or not according to the multiple weight ratios of the weight sensors 160-166. Furthermore, the control module 10 decides moving directions of the manned vehicle 1 and produces control commands corresponding to the moving directions according to the multiple weight ratios of the weight sensors 160-166 if the manned vehicle 1 needs to move. Specifically, the step S16 in the first embodiment includes following steps.

Step S160: the control module 10 compares each weight ratio with a default threshold value, such as 30% to determine whether any one weight ratio is greater than the threshold value.

In an embodiment, the memory module 22 previously stores a plurality of threshold values, and each threshold value is provided to estimate a combination of different directions. The control module 10 correspondingly selects the threshold value according to the direction corresponding to the weight ratios.

For example, it is assumed that a first threshold value and a second threshold value are previously stored in the memory module 22. The first threshold value is corresponding to a combination of the forward direction and the backward direction, and the second threshold value is corresponding to a combination of the leftward direction and the rightward direction. When the weight ratio calculated by the control module 10 corresponds to the forward direction or the backward direction, the control module 10 compares the weight ratio with the first threshold value. When the weight ratio calculated by the control module 10 corresponds to the leftward direction or the rightward direction, the control module 10 compares the weight ratio with the second threshold value.

Furthermore, the first threshold value, such as 25% may be predetermined to less than the second threshold value, such as 30% so as to effectively reduce the misjudgement due to unintentional sway in left or right direction generated from the user when the user drives the manned vehicle 1.

When the control module 10 determines that any one weight ratio is greater than the default threshold value, a step S162 is executed. On the contrary, the step S12 is executed again.

Step S162: the control module 10 decides a direction that its weight ratio is greater than the default threshold value to be the moving direction of the manned vehicle 1 and produces the control command corresponding to the moving direction.

For example, if the control module 10 decides the forward direction that its weight ratio is greater than the default threshold value to be the moving direction, the control module 10 produces a forward command to be the control command. Similarly, if the control module 10 decides the backward direction that its weight ratio is greater than the default threshold value to be the moving direction, the control module 10 produces a backward command to be the control command. Similarly, if the control module 10 decides the leftward direction that its weight ratio is greater than the default threshold value to be the moving direction, the control module 10 produces a leftward command to be the control command Similarly, if the control module 10 decides the rightward direction that its weight ratio is greater than the default threshold value to be the moving direction, the control module 10 produces a rightward command to be the control command.

In an embodiment, if more than one weight ratios are greater than the default threshold value, the moving direction is decided by the control module 10 by a statistical manner described in detail later.

Step S18: the control module 10 controls the drive module 12 to drive the manned vehicle 1 to move in the moving direction according to the control command produced by the control module 10.

For example, if the control command is the forward command, the control module 10 controls the drive module 12 to drive the manned vehicle 1 to forward move. If the control command is the backward command, the control module 10 controls the drive module 12 to drive the manned vehicle 1 to stop moving or backward move. If the control command is the leftward command, the control module 10 controls the drive module 12 to drive the manned vehicle 1 to leftward move. If the control command is the rightward command, the control module 10 controls the drive module 12 to drive the manned vehicle 1 to rightward move.

In an embodiment, the memory module 22 previously stores an acceleration value and a maximum speed value. The control module 10 controls the drive module 12 to drive the manned vehicle 1 to forward move, backward move, or stop moving according to the acceleration value and the maximum speed value.

In an embodiment, the control module 10 controls the human-machine interface 18, such as a plurality of indicator lights for indicating different moving directions to render direction indications by illuminating corresponding indicator lights during the movement of the manned vehicle 1 so as to notice the user.

For example, the control module 10 controls the human-machine interface 18 to display a forward moving indication when the control module 10 produces the forward command Similarly, the control module 10 controls the human-machine interface 18 to display a backward moving indication when the control module 10 produces the backward command Similarly, the control module 10 controls the human-machine interface 18 to display a leftward moving indication when the control module 10 produces the leftward command. Similarly, the control module 10 controls the human-machine interface 18 to display a rightward moving indication when the control module 10 produces the rightward command.

The plurality of weight sensors 16 are provided to effectively sense variations of the center of gravity of the user, and therefore to recognize the user's moving intention and control moving directions of the manned vehicle 1 according to the user's moving intention.

Furthermore, the user may intuitively control moving directions of the manned vehicle 1 according to the variations of the center of gravity thereof, thereby effectively reducing the difficulty of controlling the manned vehicle 1 and without additionally installing any manipulative device, such as a steering handle for the user.

Figure 4A:
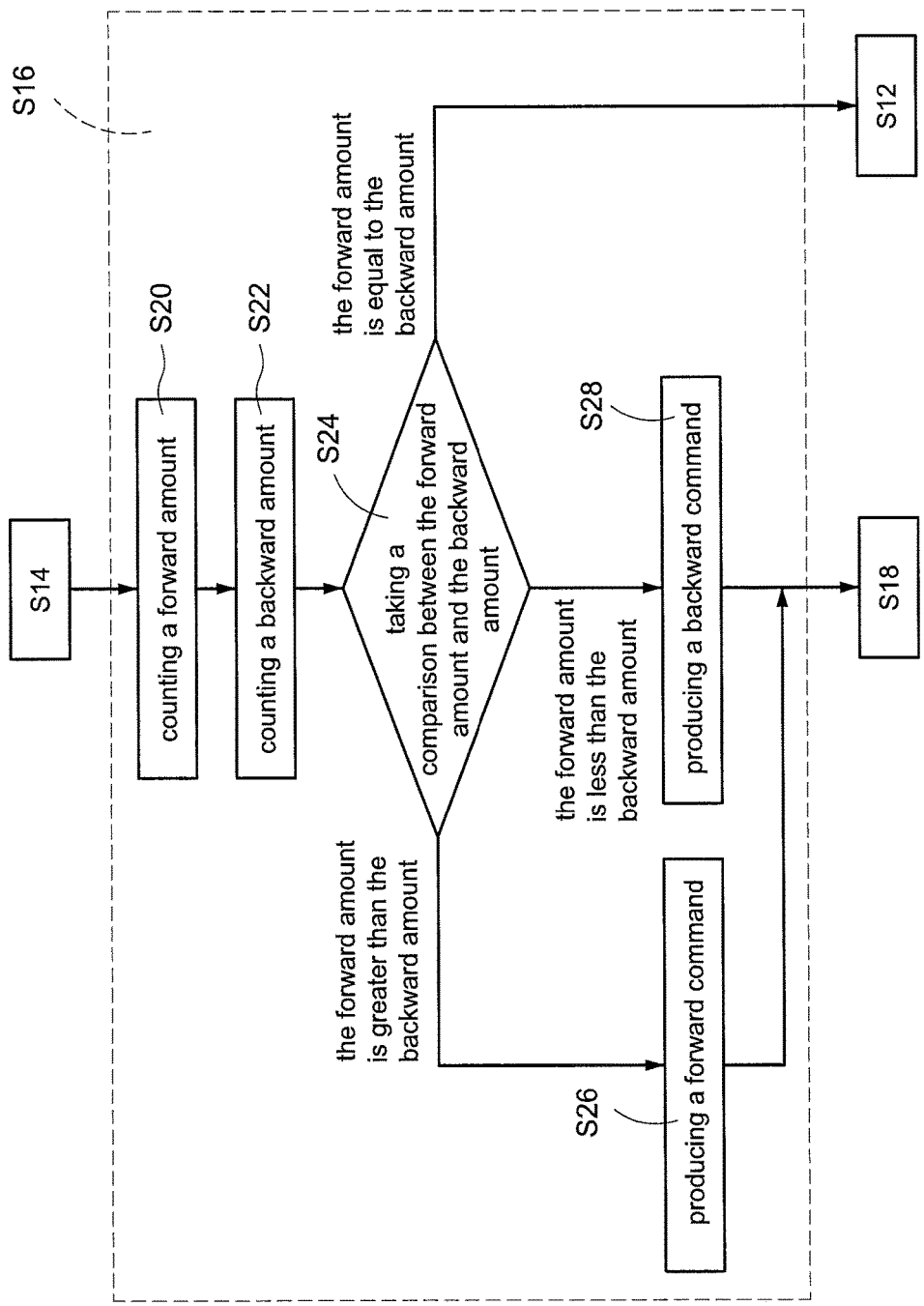
FIG. 4A shows a partial flowchart of a method of driving the manned vehicle according to a second embodiment of the present disclosure.

Refer to FIG. 3 and FIG. 4A, wherein FIG. 4A shows a partial flowchart of a method of driving the manned vehicle according to a second embodiment of the present disclosure. The second embodiment shown in FIG. 4A is provided to recognize the user's moving intention, such as a forward moving intention or a backward moving intention by a statistical manner. The step S12 and the step S14 shown in FIG. 4A are identical to those shown in FIG. 3, that is, each weight sensor 16 is provided to measure a weight variation of the carrying board 26 to produce one or more than one weight measurement values (S12) and the control module 10 calculates one or more than one weight ratios of each weight sensor 16 according to each initial weight value of each weight sensor 16 and one or more than one weight measurement values (S14). Specifically, the step S16 in the second embodiment includes following steps.

Step S20: the control module 10 identifies a plurality of weight ratios which are corresponding to the forward direction and counts the amount of the weight ratios which are greater than the first threshold value, hereinafter referred to as a forward amount.

Step S22: the control module 10 identifies a plurality of weight ratios which are corresponding to the backward direction and counts the amount of the weight ratios which are greater than the first threshold value, hereinafter referred to as a backward amount.

Step S24: the control module 10 takes a comparison between the forward amount and the backward amount.

If the forward amount is greater than the backward amount, the control module 10 executes a step S26, that is, the control module 10 produces a forward command for driving the manned vehicle 1 to forward move to be the control command. Afterward, the step S18 is executed.

If the forward amount is less than the backward amount, the control module 10 execute a step S28, that is, the control module 10 produces a backward command for driving the manned vehicle 1 to stop moving or backward move to be the control command. Afterward, the step S18 is executed.

If the forward amount is equal to the backward amount, the control module 10 fails to recognize the user's moving intention, and the step S12 is executed again.

Accordingly, the statistical manner in this embodiment can be provided to accurately recognize the user's forward moving intention or backward moving intention.

Refer to FIG. 3 and FIG. 4B, wherein FIG. 4B shows a partial flowchart of a method of driving the manned vehicle according to a third embodiment of the present disclosure. The step S16 in the third embodiment includes following steps.

Step S30: the control module 10 identifies a plurality of weight ratios which are corresponding to the leftward direction and counts the amount of the weight ratios which are greater than the second threshold value, hereinafter referred to as a leftward amount.

Step S32: the control module 10 identifies a plurality of weight ratios which are corresponding to the rightward direction and counts the amount of the weight ratios which are greater than the second threshold value, hereinafter referred to as a rightward amount.

Step S34: the control module 10 takes a comparison between the leftward amount and the rightward amount.

If the leftward amount is greater than the rightward amount, the control module 10 executes a step S36, that is, the control module 10 produces a forward command for driving the manned vehicle 1 to leftward move to be the control command. Afterward, the step S18 is executed.

If the leftward amount is less than the rightward amount, the control module 10 execute a step S38, that is, the control module 10 produces a rightward command for driving the manned vehicle 1 to rightward move to be the control command. Afterward, the step S18 is executed.

If the leftward amount is equal to the rightward amount, the control module 10 fails to recognize the user's moving intention, and the step S12 is executed again.

Accordingly, the statistical manner in this embodiment can be provided to accurately recognize the user's leftward moving intention or rightward moving intention.

In an embodiment, the steps S20-S28 shown in FIG. 4A and the steps S30-S38 shown in FIG. 4B can be simultaneously executed. In other words, the control module 10 can simultaneously recognize the forward moving intention or backward moving intention and also the leftward moving intention or rightward moving intention to correspondingly produce the control command.

Figure 5:
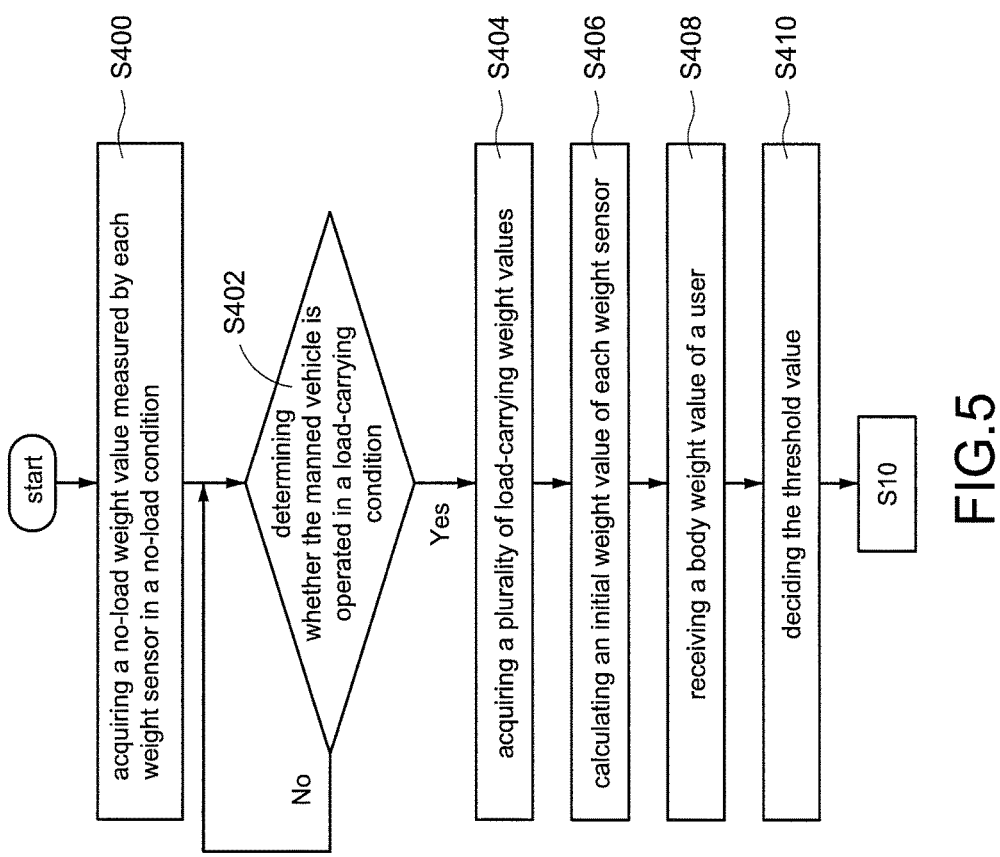
FIG. 5 shows a partial flowchart of a method of driving the manned vehicle according to a fourth embodiment of the present disclosure.

Refer to FIG. 3 and FIG. 5, wherein FIG. 5 shows a partial flowchart of a method of driving the manned vehicle according to a fourth embodiment of the present disclosure. The fourth embodiment shown in FIG. 5 further includes an initialization procedure so that the control module 10 of the manned vehicle 1 can decide different initial weight values and threshold values for different users through the initialization procedure. The initialization procedure includes following steps.

Step S400: the control module 10 acquires a plurality of no-load weight values measured by the weight sensors 16 when the manned vehicle 1 is operated in a no-load condition, namely the user does not stand on the manned vehicle 1.

In an embodiment, the control module 10 determines that the manned vehicle 1 is operated in the no-load condition to acquire weight values measured by the weight sensors 16 to be the no-load weight values after the human-machine interface 18 is initially operated by the user.

In an embodiment, the control module 10 continuously acquires a plurality of weight values measured by the weight sensors 16, determines that the manned vehicle 1 is operated in the no-load condition once the weight values are less than a default no-load weight value for a period of time, such as 5 seconds, and decides the weight values measured by the weight sensors 16 to be the no-load weight values.

Step S402: the control module 10 determines whether the manned vehicle 1 is operated in a load-carrying condition, namely the user stands on the manned vehicle 1 according to the no-load weight values.

In an embodiment, the control module 10 continuously monitors the weight values measured by the weight sensors 16 and determines that the manned vehicle 1 is operated in the load-carrying condition when a weight difference between the weight value and the no-load weight value is greater than a default load-carrying weight value.

Step S404: the control module 10 acquires a plurality of weight measurement values measured by the weight sensors 16.

In an embodiment, the control module 10 acquires a plurality of load-carrying weight values continuously measured by the weight sensors 16 within a default initial time interval, such as 5 seconds.

In an embodiment, the control module 10 continuously acquires a certain number of load-carrying weight values, such as one thousand of (1,000) load-carrying weight values from the weight sensors 16.

Step S406: the control module 10 calculates initial weight values corresponding to the weight sensors 16 according to the load-carrying weight values measured by the weight sensors 16.

In an embodiment, the control module first calculates an average load-carrying weight value of the load-carrying weight values measured by the weight sensors 16, and then decides the average load-carrying weight value to be the initial weight value for each of the weight sensors 16.

Step S408: the control module 10 receives a body weight value of the user which is inputted by the user through the human-machine interface 18 or the connection module 20.

Step S410: the control module 10 decides the threshold values, such as the above-mentioned first threshold value and second threshold value according to the body weight value of the user.

In general, the greater body weight value of the user, the greater variation of the center of gravity of the user. The control module 10 may increase the threshold values with respective to greater body weight value of the user, namely, the threshold values may be adjusted to be proportional to the body weight value of the user, thereby effectively reducing the misjudgement due to unintentional sway in left or right direction generated from the user.

Accordingly, the control module 10 of the manned vehicle 1 can decide different initial weight values and threshold values for different users through the initialization procedure, thereby effectively increasing recognition of the user's moving intentions.

Figure 6:
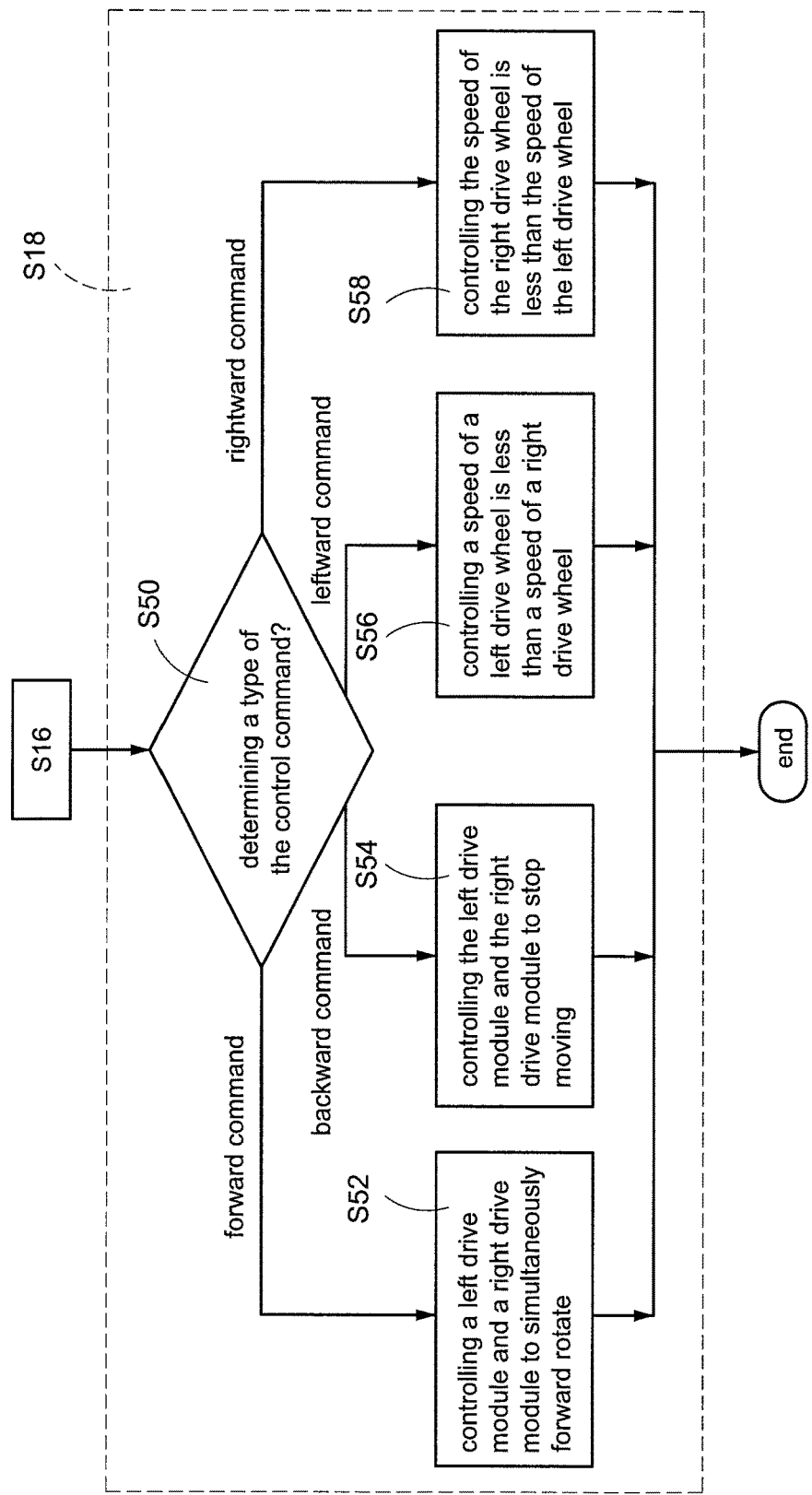
FIG. 6 shows a partial flowchart of a method of driving the manned vehicle according to a fifth embodiment of the present disclosure.

Refer to FIG. 3 and FIG. 6, wherein FIG. 6 shows a partial flowchart of a method of driving the manned vehicle according to a fifth embodiment of the present disclosure. Compared to the first embodiment in FIG. 3, the step S18 in the fifth embodiment includes following steps.

Step S50: the control module 10 determines a type of the control command produced in the step S16.

If the control command is the forward command, the control module 10 executes a step S52, that is, the control module 10 controls the left motor 1200 of the left drive module 120 and the right motor 1220 of the right drive module 122 to simultaneously forward rotate so that the manned vehicle 1 forward moves when the control module 10 realizes that the control command is the forward command. After the step S52 is completely executed, the method of driving the manned vehicle 1 controlled by the control module 10 is finished.

If the control command is the backward command, the control module 10 executes a step S54, that is, the control module 10 controls the left motor 1200 of the left drive module 120 and the right motor 1220 of the right drive module 122 to continuously reduce their speed until the left motor 1200 and the right motor 1220 are completely stopped so as to make the manned vehicle 1 reduce its speed and then stop when the control module 10 realizes that the control command is the backward command.

In general, since the user is not used to backward move, the user may fall down or bump into obstacles once the user backward moves without seeing situations behind the user. In an embodiment, therefore, the manned vehicle 1 is controlled by the control module 10 to stop moving rather than to backward move when the control module 10 receives the backward command so as to avoid falling down or bumping into obstacles.

In another embodiment different from the above-mentioned embodiment, if the control module 10 continuously detects the backward command for a default backward move time, such as three seconds after the manned vehicle 1 stops moving, the control module 10 further controls the left motor 1200 of the left drive module 120 and the right motor 1220 of the right drive module 122 to simultaneously backward rotate opposite to the forward direction so that the manned vehicle 1 backward moves.

After the step S54 is completely executed, the method of driving the manned vehicle 1 controlled by the control module 10 is finished.

If the control command is the leftward command, the control module 10 executes a step S56, that is, the control module 10 adjusts a speed of the left motor 1200 of the left drive module 120 and a speed of the right motor 1220 of the right drive module 122 so that a speed of the left drive wheel 140 is less than a speed of the right drive wheel 142 when the control module 10 realizes that the control command is the leftward command, and therefore the manned vehicle 1 gradually leftward moves. After the S56 is completely executed, the method of driving the manned vehicle 1 controlled by the control module 10 is finished.

If the control command is the rightward command, the control module 10 executes a step S58, that is, the control module 10 adjusts the speed of the left motor 1200 of the left drive module 120 and the speed of the right motor 1220 of the right drive module 122 so that the speed of the left drive wheel 140 is greater than the speed of the right drive wheel 142 when the control module 10 realizes that the control command is the rightward command, and therefore the manned vehicle 1 gradually rightward moves. After the S58 is completely executed, the method of driving the manned vehicle 1 controlled by the control module 10 is finished.

Accordingly, the manned vehicle 1 can provide a leftward/rightward move function according to a speed difference generated between two drive wheels without additionally installing any steering mechanism, thereby reducing costs of manufacturing the manned vehicle 1 and reducing the size of the manned vehicle 1.

Figure 7:
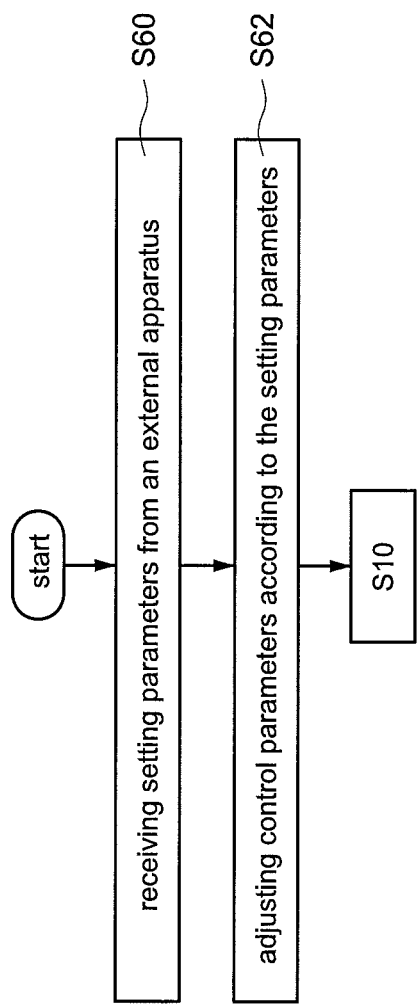
FIG. 7 shows a partial flowchart of a method of driving the manned vehicle according to a sixth embodiment of the present disclosure.

Refer to FIG. 7, which shows a partial flowchart of a method of driving the manned vehicle according to a sixth embodiment of the present disclosure. In this embodiment, an external setting function is provided for the user to conveniently and easily set the manned vehicle 1 by operating the external apparatus 3. Compared to the first embodiment in FIG. 3, before the step S10, the sixth embodiment in FIG. 7 further includes following steps.

Step S60: the control module 10 receives setting parameters from the external apparatus 3 by a wired or wireless connection built between the connection module 20 and the external apparatus 3.

The above-mentioned setting parameters may be, for example but not limited to, the body weight value of the user, the plurality of initial weight values, threshold values, the maximum speed value, the acceleration value, or the sensitivity value.

Step S62: the control module 10 adjusts control parameters of the manned vehicle 1 according to the setting parameters.

For example, it is assumed that the setting parameters include the body weight value of the user, the initial weight values, or the threshold values. The control module 10 directly replaces the setting parameters, namely the body weight value of the user, the initial weight values, or the threshold values received from the external apparatus 3 with the body weight value of the user, the initial weight values, or the threshold values stored in the memory module 22, respectively.

In another embodiment, it is assumed that the setting parameters include the maximum speed value and the acceleration value. The control module 10 stores the setting parameters, namely the maximum speed value and the acceleration value received from the external apparatus 3 and controls the drive module 12 according to the maximum speed value and the acceleration value when the manned vehicle 1 moves (in the step S18 shown in FIG. 3 or in the steps S52-S58 shown in FIG. 7) so that a maximum acceleration and a maximum speed of the manned vehicle 1 meet the maximum speed value and the acceleration value received from the external apparatus 3, respectively.

In another embodiment, it is assumed that the setting parameters include the sensitivity value. The control module 10 adjusts the threshold values, such as the first threshold value and the second threshold value according to the setting parameter, namely the sensitivity received from the external apparatus 3. For example, if the sensitivity value is equal to minus 10, the control module 10 adjusts downwards the threshold value by 10 percent; if the sensitivity value is equal to plus 15, the control module 10 adjusts upwards the threshold value by 15 percent, and so on.

Accordingly, the user can operate the external apparatus 3 to conveniently and easily set the manned vehicle 1 so as to promote an experience of using the manned vehicle 1 as well as implement the external setting function.

Furthermore, the human-machine interface 18 can be further simplified so as to reduce costs of manufacturing the manned vehicle 1 and reduce the size of the manned vehicle 1 since the external apparatus 3 is provided.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of driving a manned vehicle, applied to a manned vehicle having a plurality of weight sensors, the method comprising steps of:
   (a) acquiring correspondingly an initial weight value of each weight sensor, wherein each weight sensor is corresponding to a direction;
   (b) acquiring correspondingly a weight measurement value by each weight sensor;
   (c) calculating correspondingly a weight ratio of each weight sensor according to the initial weight value and the weight measurement value of each weight sensor;
   (d) producing a control command according to the direction corresponding to the weight sensor when the weight ratio of any one of the weight sensors is greater than a first threshold value;
   (e) driving the manned vehicle to move according to the control command;
   (g1) receiving an acceleration value and a sensitivity value from an external apparatus; and
   (g2) adjusting the first threshold value according to the sensitivity value; wherein a maximum acceleration of the manned vehicle meets the acceleration value received from the external apparatus.

2. The method of driving the manned vehicle in claim 1, wherein each weight sensor is corresponding to one of a forward direction, a backward direction, a leftward direction, and a rightward direction.

3. The method of driving the manned vehicle in claim 2, wherein
   in the step (b), acquiring a plurality of weight measurement values continuously measured by the weight sensors within a default measurement time interval, or acquiring a certain number of weight measurement values continuously measured by the weight sensors;
   in the step (c), calculating weight ratios of each weight sensor according to each initial weight value and weight measurement values of each weight sensor corresponding to the direction.

4. The method of driving the manned vehicle in claim 3, wherein each weight sensor is corresponding to the forward direction or the backward direction and also corresponding to the leftward direction or the rightward direction.

5. The method of driving the manned vehicle in claim 4, wherein the step (d) comprises steps of:
   (d11) producing a forward command or a backward command according to the direction corresponding to the weight sensor when one of the weight ratios of any one of the weight sensors is greater than the first threshold value; and
   (d12) producing a leftward command or a rightward command according to the direction corresponding to the weight sensor when one of the weight ratios of any one of the weight sensors is greater than a second threshold value.

6. The method of driving the manned vehicle in claim 3, wherein the step (d) comprises steps of:
   (d21) deciding a forward amount by counting the amount of the weight ratios which are greater than the first threshold value when the weight sensor is corresponding to the forward direction;
   (d22) deciding a backward amount by counting the amount of the weight ratios which are greater than the first threshold value when the weight sensor is corresponding to the backward direction;
   (d23) producing a forward command when the forward amount is greater than the backward amount; and
   (d24) producing a backward command when the forward amount is less than the backward amount.

7. The method of driving the manned vehicle in claim 6, wherein in the step (e), driving the manned vehicle to forward move according to the forward command or driving the manned vehicle to stop moving according to the backward command.

8. The method of driving the manned vehicle in claim 7, wherein the manned vehicle comprises a left drive module and a right drive module, wherein the left drive module is linkagely connected to a left drive wheel and the right drive module is linkagely connected to a right drive wheel, and the step (e) comprises steps of:
   (e11) controlling simultaneously the left drive module and the right drive module to rotate along a forward rotation direction according to the forward command when the forward command is detected; and
   (e12) controlling simultaneously the left drive module and the right drive module to stop rotating according to the backward command when the backward command is detected.

9. The method of driving the manned vehicle in claim 3, wherein the step (d) comprises steps of:
   (d31) deciding a leftward amount by counting the amount of the weight ratios which are greater than a second threshold value when the weight sensor is corresponding to the leftward direction;
   (d32) deciding a rightward amount by counting the amount of the weight ratios which are greater than the second threshold value when the weight sensor is corresponding to the rightward direction;
   (d33) producing a leftward command when the leftward amount is greater than the rightward amount; and
   (d34) producing a rightward command when the leftward amount is less than the rightward amount.

10. The method of driving the manned vehicle in claim 9, wherein in the step (e), driving the manned vehicle to leftward move according to the leftward command or driving the manned vehicle to rightward move according to the rightward command.

11. The method of driving the manned vehicle in claim 10, wherein the manned vehicle comprises a left drive module and a right drive module, wherein the left drive module is linkagely connected to a left drive wheel and the right drive module is linkagely connected to a right drive wheel, and the step (e) comprises steps of:
 (e21) controlling a speed of the left drive module to be less than a speed of the right drive module according to the leftward command when the leftward command is detected; and
 (e22) controlling a speed of the right drive module to be less than a speed of the left drive module according to the rightward command when the rightward command is detected.

12. The method of driving the manned vehicle in claim 9, further comprising steps of:
 (f1) providing a leftward moving indication through a human-machine interface of the manned vehicle when the leftward command is detected; and
 (f2) providing a rightward moving indication through the human-machine interface when the rightward command is detected.

13. The method of driving the manned vehicle in claim 1, before the step (a) further comprising steps of:
 (a1) entering a load-carrying condition when a weight variation is detected, and acquiring a plurality of load-carrying weight values continuously measured by the weight sensors within a default initial time interval, or acquiring a certain number of load-carrying weight values continuously measured by the weight sensors; and
 (a2) calculating correspondingly initial weight values of the weight sensors according to the load-carrying weight values measured by the weight sensors.

14. The method of driving the manned vehicle in claim 13, wherein the step (a) further comprises steps of:
 (a4) receiving a body weight value of a user; and
 (a5) determining the first threshold value according to the body weight value.

* * * * *